United States Patent
D'Amato et al.

(10) Patent No.: US 9,925,840 B2
(45) Date of Patent: Mar. 27, 2018

(54) ENCODED ELECTROMAGNETIC BASED RIDE HEIGHT SENSING

(71) Applicant: Ford Global Technologies, LLC, Dearborn, MI (US)

(72) Inventors: Anthony Mario D'Amato, Canton, MI (US); Harold Bernard Samuels, Farmington, MI (US); John Jeffrey Pfeiffer, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/090,244

(22) Filed: Apr. 4, 2016

(65) Prior Publication Data

US 2017/0282665 A1    Oct. 5, 2017

(51) Int. Cl.
*B60G 17/018*    (2006.01)
*B60G 17/016*    (2006.01)
*G01D 5/14*    (2006.01)

(52) U.S. Cl.
CPC ........... *B60G 17/016* (2013.01); *G01D 5/142* (2013.01); *B60G 2204/62* (2013.01); *B60G 2401/172* (2013.01); *B60G 2500/30* (2013.01); *B60G 2600/182* (2013.01)

(58) Field of Classification Search
USPC ......................................................... 701/37
See application file for complete search history.

(56) References Cited

U.S. PATENT DOCUMENTS

| | | | |
|---|---|---|---|
| 4,079,322 A | 3/1978 | Lawrence et al. | |
| 4,674,768 A | 6/1987 | Morra | |
| 4,836,578 A | 6/1989 | Soltis | |
| 6,234,654 B1 | 5/2001 | Okuchi et al. | |
| 6,293,562 B1 * | 9/2001 | Kutscher | B60G 17/016 280/5.5 |
| 6,565,073 B1 * | 5/2003 | Carlstedt | B60G 17/0157 188/267 |
| 6,772,062 B2 | 8/2004 | Lasky et al. | |
| 8,174,255 B2 | 5/2012 | Peterson et al. | |

(Continued)

FOREIGN PATENT DOCUMENTS

| | | |
|---|---|---|
| GB | 2217837 A | 11/1989 |
| WO | WO 2007003807 A2 | 1/2007 |

OTHER PUBLICATIONS

Search Report dated Sep. 14, 2017 for Great Britain Patent Application No. GB 1704399.3 (4 Pages).

*Primary Examiner* — Tyler D Paige

(74) *Attorney, Agent, or Firm* — James P. Muraff; Neal, Gerber & Eisenberg LLP

(57) ABSTRACT

Various embodiments of the present disclosure provide a ride height sensing system that includes an encoded electromagnetic source as an input unit for a Hall Effect sensors and the signal from the electromagnet is encoded to enable the rejection of ambient magnetic field. In various embodiments of the present disclosure, a band pass filter is used for signal processing of the encoded electromagnetic data. Additionally, several Hall Effect sensors may be used with a single electromagnetic source to provide multi-axis sensing and as such, provides robustness in determining ride height changes, or in the case of dependent suspensions (solid axle), a single electromagnetic source can used to determine ride height at multiple locations on the axle.

20 Claims, 6 Drawing Sheets

(56) References Cited

U.S. PATENT DOCUMENTS

| | | | |
|---|---|---|---|
| 2001/0005803 A1* | 6/2001 | Cochofel | B60G 17/0185 701/1 |
| 2002/0035423 A1* | 3/2002 | Shank | B60G 17/0185 701/37 |
| 2003/0046021 A1* | 3/2003 | Lasky | G05D 1/0261 702/150 |
| 2003/0154050 A1* | 8/2003 | Murray | G01B 5/255 702/166 |
| 2004/0036601 A1* | 2/2004 | Obradovich | H04L 61/2553 340/540 |
| 2004/0222789 A1* | 11/2004 | Pinsky | G01N 27/72 324/261 |
| 2009/0039874 A1 | 2/2009 | Kreit et al. | |
| 2014/0035597 A1 | 2/2014 | Luszczewski | |
| 2017/0083844 A1* | 3/2017 | Baker | G06Q 10/06312 |

\* cited by examiner

ENCODED ELECTROMAGNETIC BASED RIDE HEIGHT SENSING

TECHNICAL FIELD

The present disclosure generally relates to an encoded electromagnetic based ride height sensing system for a vehicle. More particularly, the ride height sensing system of the present disclosure includes an encoded electromagnetic source and one or more magnetometers, such as Hall effect based sensors, to determine a change in ride height of a vehicle body.

BACKGROUND

Drivers commonly encounter obstacles—such as potholes, rocks, fallen branches, and other debris—in the roadway when driving their vehicles. Such obstacles cause the vehicle body to move with respect to the wheels of the vehicle and thereby create a change in the distance between the vehicle chassis and the ground, commonly referred to as the ride height. Vehicles include ride height sensing system to detect this change in ride height and adjust the vehicle suspension in response to the received data.

Ride height sensing systems measure the distance between a specified point on the chassis, suspension or body of a vehicle and the ground. As the vehicle is loaded and unloaded, ride height sensing systems detect the change in ride height of the vehicle and provide input to vehicle suspension systems to change the way the suspension reacts to changing road conditions or load. By utilizing a vehicle's suspension system, the vehicle may provide a smoother ride on a rough road, a lower ride for better aerodynamics at high speed, or a raised ride for increased off-road ground clearance.

Existing ride height sensing systems include physical linkage systems that are subject to impact damage and require moving parts and levers, and thus prevent an accurate read. Other existing non-linkage ride height systems include systems that utilize ultrasonic lasers. One drawback with these systems is that they require a line of sight between a reflector and transmitter and the transmission medium must be constant to maintain accuracy. Such systems are not accurate in an uncontrolled environment.

A third type of existing ride height sensing systems is a magnetic based system for ride height sensing. These systems are beneficial because they are immune to dirt and water interference. However, existing magnetic ride height sensing systems are susceptible to interfering ambient sources and for certain applications, provide a very slow response time.

Accordingly, there is a continuing need for new and improved systems for ride height sensing that is not susceptible to impact damage, immune to line of sight interference and medium changes and can provide fast and accurate measurements.

SUMMARY

The appended claims define this application. The Specification summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Exemplary embodiments provide a ride height sensing system that includes an encoded electromagnetic source as an input unit for a Hall effect sensors and the signal from the electromagnet is encoded so as to distinguish the encoded magnetic field from ambient magnetic field(s). In various embodiments of the present disclosure, a band pass filter is used for signal processing of the encoded electromagnetic data. Additionally, several Hall Effect sensors may be used with a single electromagnetic source to provide multi-axis sensing and as such, provides robustness in determining ride height changes, or in the case of dependent suspensions (solid axle), a single electromagnetic source can used to determine ride height at multiple locations on the axle.

Existing magnetic ride height sensing systems include a high strength permanent magnet or electromagnet emitting a constant magnetic field, which requires limited separation between the magnet and the sensor. Feedback from such systems is slow and may require several seconds of averaging in order to filter out surrounding interfering magnetic fields. To overcome these problems, the ride height sensing system of the present disclosure utilizes an electromagnet source, capable of high-bandwidth switching, to replace the permanent magnet or constant electromagnetic source. The high bandwidth electromagnetic source is encoded with a specific frequency(s) to maintain environmental robustness against interfering magnetic fields. More specifically, the high bandwidth electromagnetic source of the ride height sensing system of the present disclosure is capable of high switching rates and outputs a magnetic signal at a desired frequency. A frequency band pass filter is used to extract the encoded signal from the measurement of total magnetic field. Such a configuration eliminates mechanical linkages for ride height sensing, is immune to line of sight interference and the response is fast and accurate.

BRIEF DESCRIPTION OF THE DRAWINGS

For a better understanding of the invention, reference may be made to embodiments shown in the following drawings. The components in the drawings are not necessarily to scale and related elements may be omitted to emphasize and clearly illustrate the novel features described herein. In addition, system components can be variously arranged, as known in the art. In the figures, like referenced numerals may refer to like parts throughout the different figures unless otherwise specified.

DETAILED DESCRIPTION OF EXAMPLE EMBODIMENTS

Figure 1:
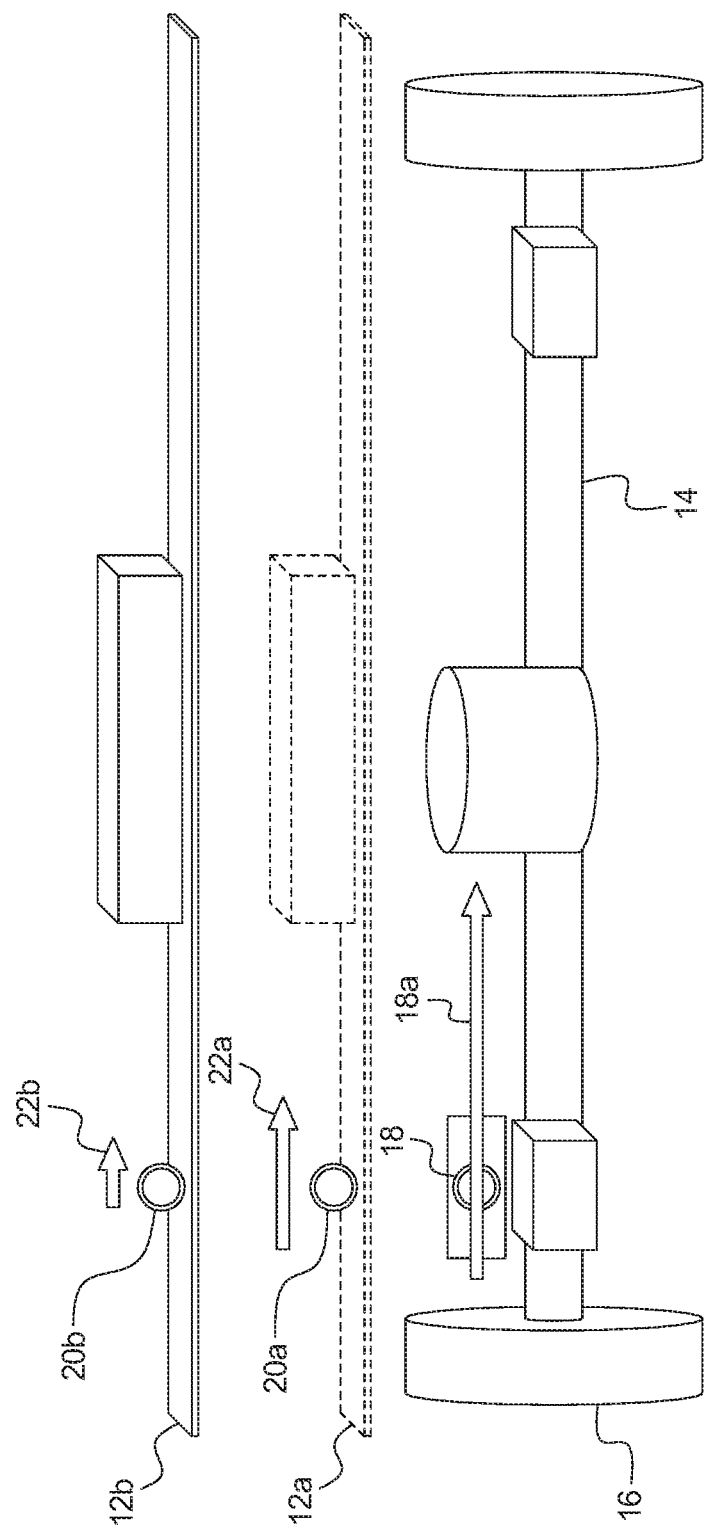
FIG. 1 illustrates an example of an existing magnetic ride height sensing system.

While the encoded electromagnetic based ride height sensing system (referred to throughout this specification as the ride height sensing system for brevity) of the present disclosure may be embodied in various forms, the figures show and this Specification describes some exemplary and non-limiting embodiments of the ride height sensing system. The present disclosure is an exemplification of the ride height sensing system and does not limit the ride height sensing system to the specific illustrated and described embodiments. Not all of the depicted or described components may be required, and some embodiments may include additional, different, or fewer components. The arrangement and type of the components may vary without departing from the spirit or scope of the claims set forth herein.

Various embodiments of the present disclosure provides an improved ride height sensing system for a vehicle that overcomes many of the challenges of existing ride height sensing systems. Ride height sensing systems measure the distance between a specified point on the chassis, suspension or body of a vehicle and the ground. More specifically, vehicular ride height sensing systems include a plurality of sensors that constantly measure the distance between the vehicle axles and the vehicle body, and send the measured data to the vehicle's electronic control unit. As the vehicle is loaded and unloaded, the data from the ride height sensors will change. These changes are registered by a controller or a vehicle electronic control unit and provide input to vehicle suspension systems to change the way the suspension reacts to changing road conditions or load. The suspension modifications may provide a smoother ride on a rough road, a lower ride for better aerodynamics at high speed, or a raised ride for increased off-road ground clearance.

For example, a first category of ride height sensing systems includes physically connected, or linked, systems. More specifically, this type of existing ride height sensing systems include potentiometer-based systems that include a physical link between an un-sprung mass and a sprung mass, and a variable resistor to provide a direct measurement of the distance between the two masses. These systems include many moving parts and levers and also involve complex linkages for dependent suspensions, such as solid axles. With so many moving parts and particularly, because of the physical link between the two masses, these systems are susceptible to impact damage, which would prevent an accurate read.

Another existing non-contact ride-height measurement system utilizes ultrasonic or optical distance measurements. One drawback with these systems is that they require a clear line of sight between a reflector and transmitter and the transmission medium must be constant to maintain accuracy. Systems that utilize these distance sensing techniques also may be non-functioning if the line of sight is lost due to large suspension articulation or debris such as mud. These systems are typically utilized in controlled environments, such as for auto racing. Under such conditions, the vehicle ride height system is not likely to encounter external debris or changes in medium (i.e., mud or water) that may obstruct a line of sight. However, such systems are not accurate in an uncontrolled environment.

A third type of existing ride height sensing systems is a magnetic based system for ride height sensing. Such systems include a high strength permanent or electromagnet magnet that outputs a constant magnetic signal, and a Hall effect based sensor that detect a change in the magnetic field to determine a change in the ride height of a vehicle. These systems are beneficial because they are immune to dirt and water interference. However, existing magnetic ride height sensing systems require that the magnetic source and the hall effect sensor be mounted close together to reasonably eliminate ambient magnetic disturbances.

FIG. 1 illustrates an example embodiment of a prior art permanent magnet based ride height sensing system. As illustrated in FIG. 1, existing magnetic-based ride height sensing systems include a Hall effect based sensor 20a, 20b, and a magnetic source 18 such as a permanent magnet, which emits a constant magnetic signal represented by the arrow 18a. In this embodiment, the magnetic source 18 is mounted to the vehicle axle 14 between the two rear wheels 16. FIG. 1 illustrates a vehicle body 12a at a first distance from the rear axle 14, and the vehicle body 12b at a second, greater distance from the rear wheel axel 14. The Hall effect based sensor 20a, 20b is mounted to the vehicle body 12a, 12b.

In such systems, the separation between the sensor and the magnet must be minimal. This is because the strength of the magnetic field varies inversely with the cube of distance. Turning back to FIG. 1, the car body 12a represents the car body at a first distance away from the vehicle axle 14, and the car body 12b represents the car body at a second, greater distance away from the vehicle axle 14. The length of arrow 22a represents the strength of the magnetic field sensed from the hall effect based sensor 20a, when the vehicle car body 12a is at a first distance from the vehicle axle 14. The length of arrow 22b represents the strength of the magnetic field sensed from the hall effect based sensor 20b, when the vehicle car body 12b is at a second distance from the vehicle axle 14. As illustrated in FIG. 1, the arrow 22a is longer than the arrow 22b, which indicates that when the vehicle body 12a is closer to the axle 14, the hall effect sensor detects a greater magnetic field strength than when the vehicle body 12b is a greater distance away, even though the strength of the magnetic field emitted 18a by the permanent magnet 18 is the same. In other words, at the shorter distance, the hall effect sensor 20a detects a stronger magnetic field 22a, that at a greater distance away. Thus, the further the permanent magnet is moved away from the sensor, the more power the sensor must be to detect any magnetic field. For such systems, the separation between the sensor and magnetic field source is approximately one inch, and any larger separation would require more powerful magnetic force.

Furthermore, in these systems, a change in ride height is determined by a change in the magnetic field sensed by the Hall effect sensor. It should be appreciated, however, that there are other ambient magnetic fields that interfere with the magnetic field signal from the permanent magnetic source. For example, the magnetic field emitted from the earth or other local disturbances may be detectable by the Hall effect based sensors. Thus, in addition to the magnetic field signal emitted by the permanent magnetic source, the Hall effect based sensors detect the surrounding ambient magnetic fields. Accordingly, the permanent magnet used in such systems must be a high strength magnet so as to be the dominate local magnetic field, furthermore, several seconds of signal averaging may be required to filter out interfering magnetic fields. This is especially true for applications such as truck bed height leveling, where ride height level control is closed around slow feedback from magnetic field based sensing. For the system described in this work, the speed of the feedback control is configured by choice of the encoding frequency of the magnetic source, specifically; faster control is achieved by choosing higher frequencies. The higher the encoding frequency the faster the band-pass filter will resolve the encoded signal out of the total magnetic field measurement. In this manner, control rate can be made to be arbitrarily fast or slow.

Various embodiments of the present disclosure provide a ride height sensing system that overcomes these problems by replacing the permanent magnetic source with a frequency encoded electromagnetic source that outputs a magnetic field signal at a specified frequency. The ride height sensing system of the present disclosure also includes a plurality of Hall effect based sensors that detect a change in magnetic field strength to determine a change in ride height of the vehicle. More specifically, the electromagnetic source is encoded based on signal frequency to maintain environmental robustness against interfering surrounding magnetic field and to enable the rejection of interfering ambient magnetic fields. The data received from the hall effect based sensors is filtered to extract the encoded signal from the total measured magnetic field signal to provide an accurate measurement of any changes in the encoded magnetic field which correspond to changes in the ride height.

Accordingly, as will be described in greater detail below, the ride height sensing system of the present disclosure does not require mechanical linkages. More specifically, the ride height sensing system of the present disclosure is resistant to impact damage and is immune to line of sight interference and medium changes (i.e., water). As such, the ride height sensing system is capable of providing accurate measurements while underwater and when covered with mud. Additionally, the ride height sensing system of the present disclosure provides a fast measurement response. That is, the ride height sensing system enables features such as rear damping adjustment after anomaly detection at the front wheels. Furthermore, to alleviate the difficulties with determining ride height for solid rear axles, the ride height sensing system is also accurate for extreme articulation. That is, the rear axle moves in multiple directions and the ride height sensing system of the present disclosure accounts for the movement in multiple directions to determine an accurate reading of the ride height. As such, the ride height sensing system of the present disclosure easily supports dependent suspension (solid axle) applications.

Figure 2:
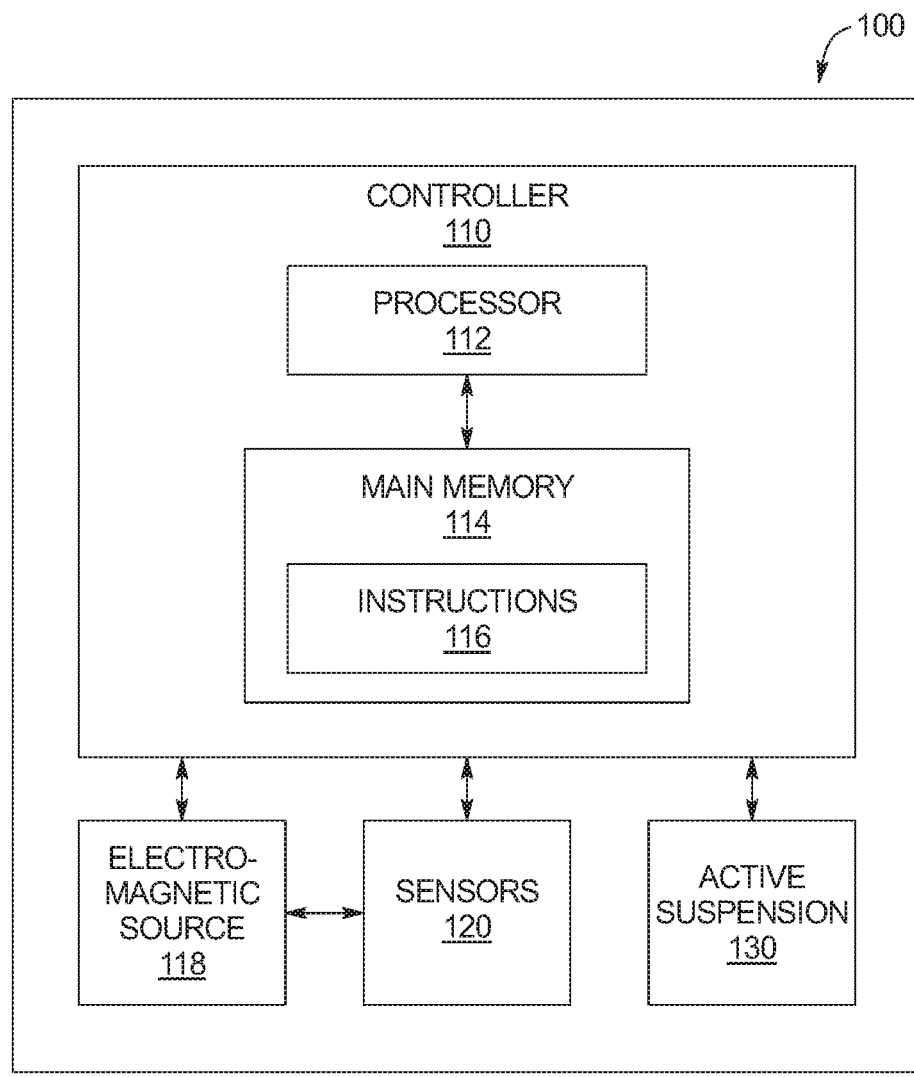
FIG. 2 is a block diagram including components of one embodiment of the ride height sensing system of the present disclosure.

FIG. 2 illustrates one example embodiment of the ride height sensing system 100 of the present disclosure. Other embodiments of the ride height sensing system may include different, fewer, or additional components than those described below and shown in FIG. 2.

The ride height sensing system 100 includes an encoded electromagnetic source 118 and one or more sensors 120 in communication with the controller 110. As described above, the ride height sensing system collects data regarding the ride height of the vehicle body, and sends the measured data to the vehicle's electronic control unit. As the vehicle loads changes and the ride height of the vehicle changes, the data from the ride height sensors will change. These changes are registered by the controller 110 and provide input to vehicle suspension systems, such as the active suspension system 130 depicted in FIG. 2. Each active suspension is associated with a different wheel of the vehicle. In certain embodiments each wheel is associated with an active suspension; while in other embodiments fewer than all of the wheels are each associated with an active suspension. The active suspensions 130 are in communication with the controller 110, and the controller utilizes the data collected by the ride height sensors to change the way the suspension reacts to changing road conditions or load.

The encoded electromagnetic source 118 of the present disclosure is capable of high switching rates, specifically; a magnetic field can be created and collapsed at a specified frequency. The data received from the hall effect based sensors 120 is then filtered to determine the amplitude of magnetic field at the specified frequency of the electromagnetic source and any change in the amplitude of the magnetic field is due to a change in ride height. Accordingly, this source 118 enables rejection of ambient magnetic fields, and allows a greater range of sensing distance for a given magnetic field strength.

The ride height sensing system 100 includes a plurality of sensors 120. As described above, these sensors 120 include hall effect based sensors for sensing a change in the magnetic field to determine a change in ride height. A Hall effect based sensor is a transducer that varies its output voltage in response to a magnetic field. With a known magnetic field, the distance from the Hall plate can be determined. In addition to Hall effect based sensors, in certain embodiments, the ride height sensing system also includes other types of sensors to obtain data about the environment surrounding the vehicle and about components of the vehicle itself. The sensors 120 transmit the data to a controller 110 for further processing. Such sensors 120 may include, but are not limited to: infrared sensors, cameras or other visual sensors, ultrasonic sensors, RADAR, LIDAR, laser-scan sensors, inertial sensors (for example, a suitable inertial measurement unit), wheel speed sensors, road condition sensors (to directly measure certain road conditions), rain sensors, suspension height sensors, steering wheel angle sensors, steering torque sensors, brake pressure sensors, tire pressure sensors, and/or a Global Positioning System or other vehicle location or navigation sensor.

The ride height sensing system 100 includes a controller 110 including at least one processor 112 in communication with a main memory 114 that stores a set of instructions 116. The processor 112 is configured to communicate with the main memory 114, access the set of instructions 116, and execute the set of instructions 116 to cause the ride height sensing system 100 to perform any of the methods, processes, and features described herein.

The processor 112 may be any suitable processing device or set of processing devices such as, but not limited to: a microprocessor, a microcontroller-based platform, a suitable integrated circuit, or one or more application-specific integrated circuits (ASICs). The main memory 114 may be any suitable memory device such as, but not limited to: volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.); unalterable memory (e.g., EPROMs); or read-only memory.

Figure 3:
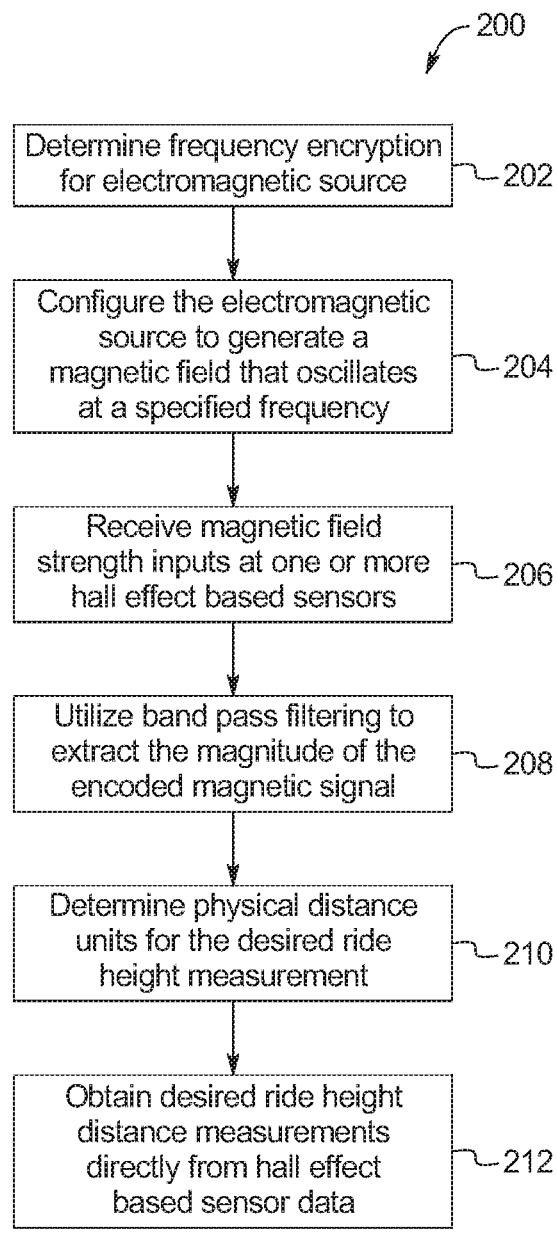
FIG. 3 illustrates a flow chart of an example process of operating the ride height sensing system of the present disclosure according to one embodiment.
Figure 4:
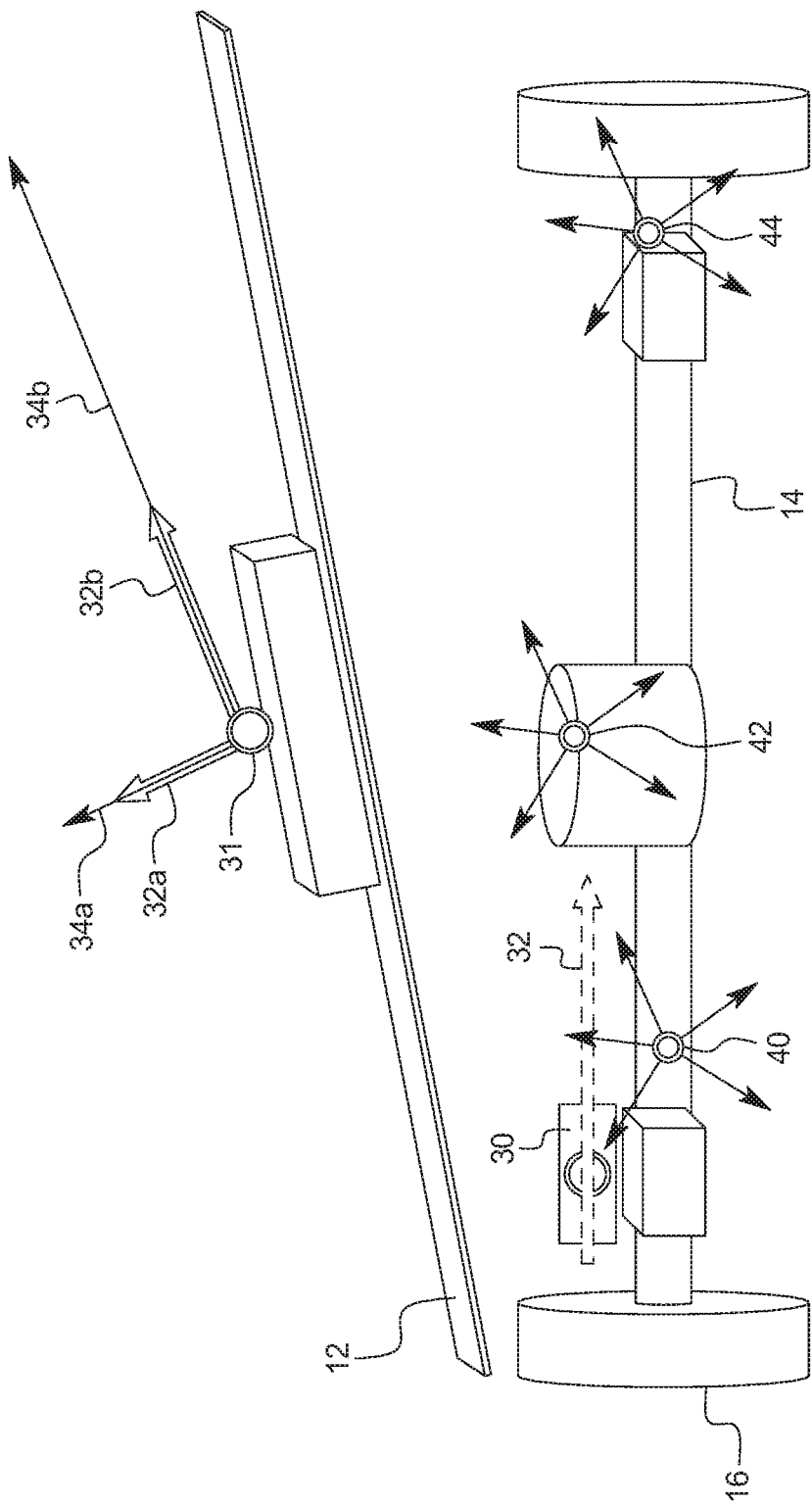
FIG. 4 illustrates an example embodiment of the ride height sensing system of the present disclosure including multi-axis sensing.

Turning to FIG. 3, which illustrates an example embodiment of the present disclosure. More specifically, FIG. 4 illustrates a vehicle axle 14 between two wheels 16 and a car body 12. An encoded electromagnetic source 30 is fixed to the axle 14, and a Hall effect based sensor 31 is fixed to the vehicle body 12. The arrow 32 represents the magnetic signal from the encoded electromagnetic source 30. It should be appreciated that the arrow 32 is depicted as a broken arrow. This is because the magnetic field signal emitted from the encoded electromagnetic source is an oscillating signal that continues to switch on and off at a specified frequency. As illustrated in FIG. 4, in addition to the magnetic signal from the encoded electromagnetic source, there are ambient magnetic signals present from local disturbances 40, 42, 44. Similar to the existing technology, in the system and method of the present disclosure, if the source 30 is not closely located to the sensor 31, a measurement error would be induced by the surrounding magnetic fields 40, 42, 44. This is because the sensed magnetic field by the Hall effect sensor 31 on the vehicle body 12 is the sum of the local disturbances 40, 42, 44 and the encoded magnetic field signal 32.

However, because the ride height sensing system of the present disclosure includes a frequency encoded electromagnetic source, the data received from the Hall effect sensors can be filtered to obtain the magnetic field signal from the electromagnetic source 30. More specifically, with the source magnetic field 32 encoded at a specific known frequency, the data received from the Hall effect based sensor 31 can be band pass filtered to extract only the data at the frequency of the encoded electromagnetic source 30, thereby removing spurious magnetic content generated by surrounding components or the environment.

Applying a band pass filter is a process that passes frequencies within a certain range and rejects (attenuates) frequencies outside that range so as to reduce the ambient noise from the data collected by the Hall effect based sensor. As shown in FIG. 4, sensed magnetic field is the sum of the local disturbances and the encoded magnetic signal. The desired signal is encoded therefore; it can be filtered out of the total sensed magnetic field.

It should be appreciated that, as illustrated in FIG. 3, the car body is angled so that one side of the car body is higher than the other side of the car body. As such, the ride height has been changed in multiple directions. Unlike existing systems that may include multiple sensors to determine the change in ride height in the different directions, the ride height system of the present disclosure is a multi-axis system. Multi axis sensing yields magnetic components which can be resolved into distance, and in the case of dependent suspension (solid axles), an absolute distance and rotation. The implication of multi-axis sensing is the need for a single sensor set for solid axle applications.

Figure 5:
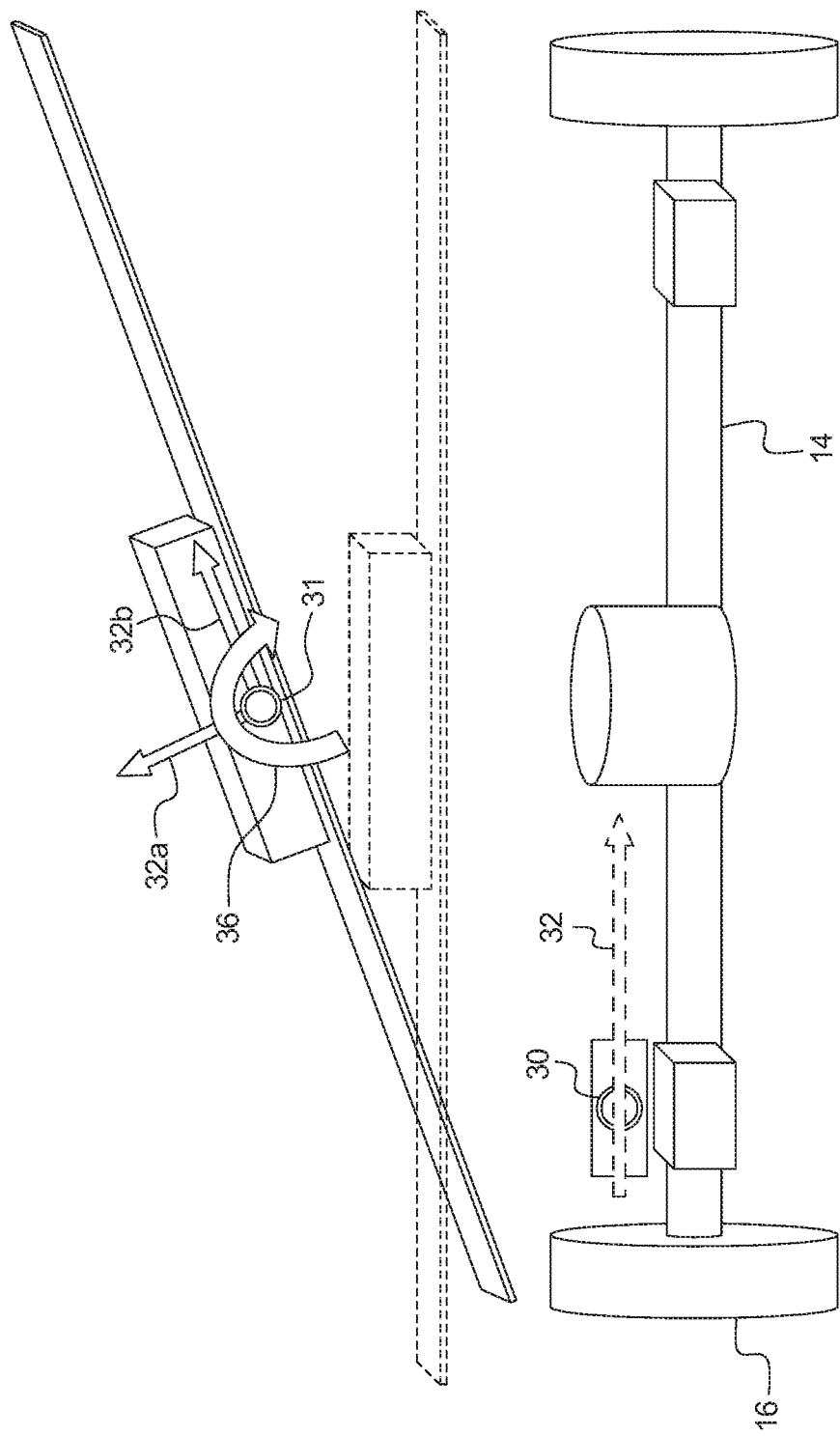
FIG. 5 illustrates the example embodiment of FIG. 4 of the ride height sensing system of the present disclosure including multi-axis sensing.

It should be appreciated that, as shown in FIGS. 4 and 5, the vehicle body 12 is angled and the hall effect sensor 31 senses the magnetic fields emitted by the encoded signal 32 and the local disturbances 40, 42, 44 in all directions. More specifically, as shown in FIG. 3, the sensed magnetic field, as indicated by arrows 34a, 34b is the sum of the local disturbances and the encoded magnetic signal 32. The desired signal is encoded and can be filtered out of the total sensed magnetic field, as represented by arrows 32a and 32b in FIG. 4. The ride height sensing system of the present disclosure is a multi-axis system, and the magnetic field data received by the Hall effect sensor can also be filtered to extract the magnitude of the magnetic field along the relevant axes. Multi-axis sensing can resolve rotations distinctly from distance change. This reduces complexity by allowing a single sensor set to be used for solid axle applications.

Furthermore, multi-axis sensing can used to measure distance changes in the horizontal direction (where ride height would be considered the vertical direction), horizontal distance changes would be indicators of undesirable vehicle behavior such as wheel hop or damage to the suspension components. Therefore, a multi-axis ride height system can be used to diagnose these conditions.

FIG. 3 illustrates a flow chart of an example process or method 200 of operating the ride height sensing system of the present disclosure. In various embodiments, process 200 is represented by a set of instructions stored in one or more memories and executed by one or more processors (such as those described above in connection with FIG. 2). Although process 200 is described with reference to the flowchart shown in FIG. 3, many other processes of performing the acts associated with process 200 may be employed. For example, the order of certain of the illustrated blocks may be changed, certain of the illustrated blocks may be optional, or certain of the illustrated blocks may not be employed.

In operation of this embodiment, the ride height sensing system determines a frequency encryption for an electromagnetic source, as indicated by block 202. More specifically, to account for the ambient noise of the interfering magnetic fields from the environment surrounding the vehicle, the encoded electromagnetic source of the present disclosure is encrypted to output a magnetic signal based on a desired frequency, which provides a baseline magnetic signal for the Hall effect based sensors to read. The sensed magnetic field data from Hall effect based sensor may be filtered to extract the encoded magnetic field signal and distinguish between the desired magnetic signal and ambient noise from the surrounding environment. It should be appreciated that the determined encryption frequency may vary depending upon the desired measurement speed. Furthermore, encrypting the magnetic source a specified frequency allows the use of multiple electromagnetic sources on a single vehicle, where each of the electromagnetic sources is encrypted with a unique frequency eliminating the potential for cross interference between the systems. Finally, a single magnetic source may be encoded with several frequencies, the increased complexity makes it difficult for a malicious/exogenous sensing system to resolve ride height without explicit knowledge of the encryption frequencies (for example, two vehicles equipped with this system driving or parked close together.

Using the chosen encryption frequency, the ride height sensing system configures the electromagnetic source to output a magnetic field signal that oscillates at the desired encryption frequency(s), as indicated by block 204. As described above, the ride height sensing system of the present disclosure includes one or more Hall effect based sensors to measure any magnetic fields surrounding the sensor. In the embodiments described in this specification, the electromagnetic source is fixed to the vehicle axle and the one or more hall effect based sensors are fixed to the underside of the vehicle body. It should be appreciated that in certain alternative embodiments, the hall effect sensors may be fixed to the axle and the electromagnetic source may be fixed to the vehicle body.

After outputting a magnetic field at the specified frequency, the process 200 includes receiving data regarding the magnetic field strength readings from the Hall effect based sensors, as indicated by block 206. As described above, this data from the Hall effect based sensors includes the total sensed magnetic field, which is the sum of the encoded magnetic signal and any ambient magnetic fields such as from other local disturbances. To obtain an accurate ride height measurement, the data from the hall effect based sensor must be filtered to extract only the encoded magnetic signal from the encoded electromagnetic source.

The ride height sensing system of the present disclosure utilizes band pass filtering to extract the amplitude of the encoded magnetic signal, as indicated by 208. That is, the system of the present disclosure utilizes a band pass filter on the sensor data to allow for real-time extraction of the amplitude of the magnetic field generated by the electromagnet, from the total sensed magnetic field, which may include disturbances due to other magnetic fields generated by other vehicle components or the environment signal. Band pass filters typically output a signal or signals within the band pass frequency, therefore an additional processing step must be completed to determine the amplitude of the signals at the band pass frequency. In one embodiment, the band pass filter can be made to output the amplitude of the signal at the band pass frequency directly without the need for an additional signal processing step. In certain embodiments, after obtaining the encoded magnetic signal from various distance points, the system of the present disclosure determines physical distance units for the desired ride height measurement, as indicated by block 210. More specifically, the system of the present disclosure utilizes several known distance points between filed source and sensor to correlate the field strength and the physical distance. The resulting model may then be used to obtain distance measurements directly from the filtered hall effect based sensor.

Using these physical distance units, the system of the present disclosure may be configured to obtain desired ride height distance measurements directly from the Hall effect based sensor data, as indicated by block 212.

Figure 6:
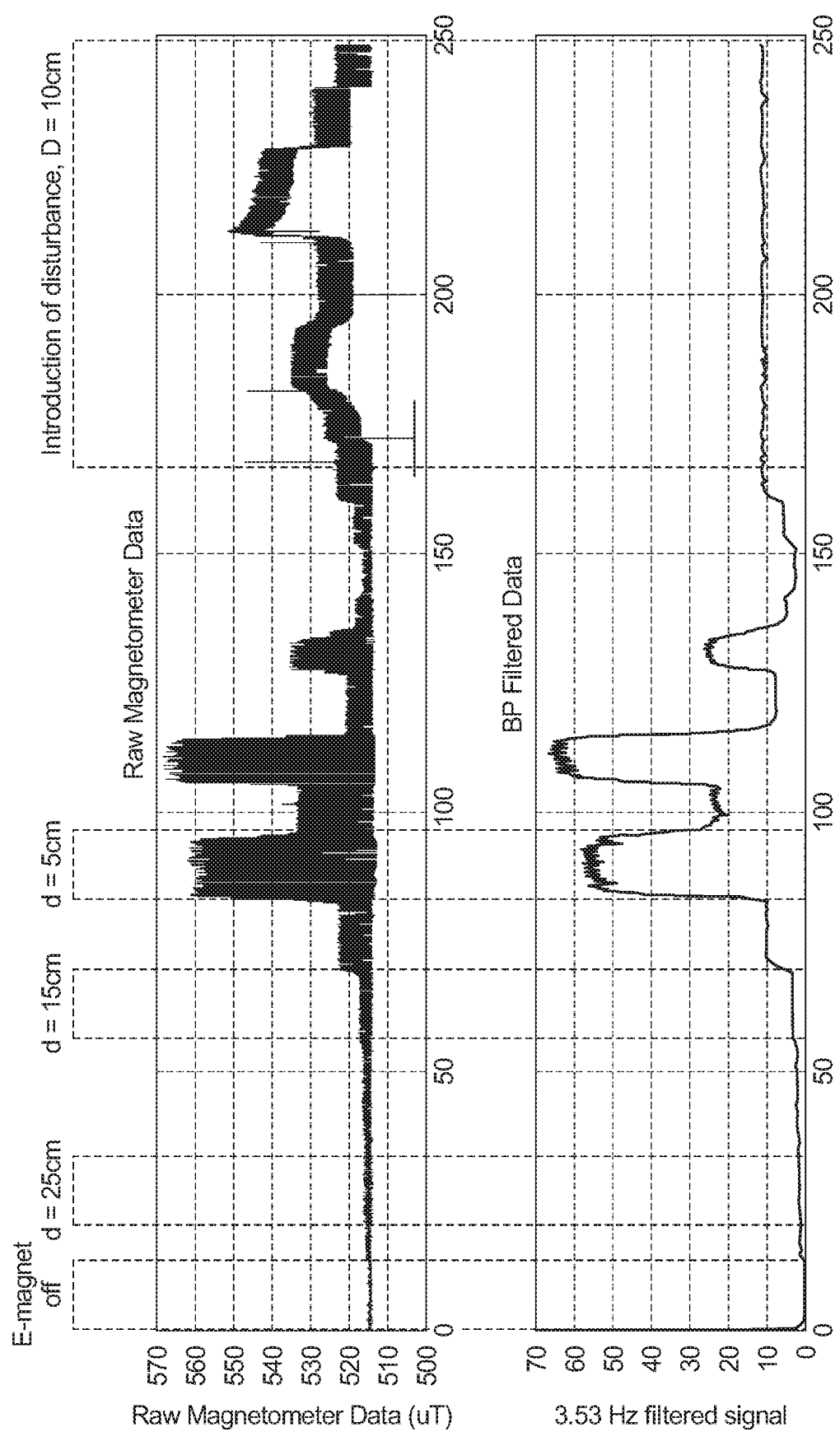
FIG. 6 is a graph illustrating an example process of one embodiment of the ride height sensing system of the present disclosure in operation.

FIG. 6 depicts a graph of the sensed raw magnetometer data from a hall effect based sensor over time and the band pass filtered data from the hall effect based sensor over time for an example embodiment. In this example embodiment, the electromagnetic source generates a magnetic field that oscillates on and off at a frequency of 3.5 Hz. In this example embodiment, the electromagnetic source is moved several distance points away from the hall effect based sensor, as indicated at the top of the graphs.

First, a baseline is measured where the electromagnet was turned off. As illustrated in FIG. 6, the raw magnetometer reading when the electromagnet was turned off is 515 uT. The filtered signal indicates the amplitude of the signal at 3.5 Hz is 0 uT. This shows that when the electromagnet is off, the filtered reading is also 0.

Second, the source was moved a second distance of 25 cm away from the sensor. The raw magnetometer reading when the electromagnet is at a distance of 25 cm from the hall effect based sensor oscillates between 515 uT and approximately 517 uT. The filtered signal indicates the amplitude of the magnetic field oscillating at 3.5 Hz is 2 uT. As described above, the amplitude reading can be converted to physical distance units to determine ride height.

Third, the source was moved a third distance of 5 cm away from the sensor. The raw magnetometer reading when the electromagnet is at a distance of 5 cm from the hall effect based sensor oscillates between approximately 515 uT and 560 uT. The filtered signal shows that the amplitude of the magnetic field at 3.53 Hz is about 60 uT. As described above, the filtered signal amplitude at the specified frequency, in this case 3.5 Hz) could be converted to physical distance units to determine ride height. It should be appreciated that the strength of the magnetic field is greater at a distance of 5 cm than at a distance of 15 cm, as described above.

In the final rectangular block at the end of the graphs, the distance between the electromagnetic source and the hall effect based sensor is held constant and various disturbances re introduced. These disturbances represent ambient noise from local sources. The disturbances re introduced when the hall effect sensor and the electromagnetic source are 10 cm from one another. As illustrated in FIG. 6, the raw magnetometer data includes spikes, and spurious amplitude changes which indicate that the hall effect based sensor is sensing increased magnetic field strength during that period of time. However, the filtered data does not include corresponding spikes. The filtered data remains unchanged at 3.5 Hz, which indicates that the electromagnetic source is stationary. Accordingly, as long as the disturbance is not oscillating at the encoding frequency, the filtered signal should not register a change in field strength. If the electromagnetic source had not been encoded, the spurious jumps in the raw hall effect sensor data would be erroneously perceived as changes in ride height.

Any process descriptions or blocks in the figures, should be understood as representing modules, segments, or portions of code that include one or more executable instructions for implementing specific logical functions or steps in the process, and alternate implementations are included within the scope of the embodiments described herein, in which functions may be executed out of order from that shown or discussed, including substantially concurrently or in reverse order, depending on the functionality involved, as would be understood by those having ordinary skill in the art.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle having a ride height sensing system comprising:
   an electromagnetic source configured to produce a magnetic field at a specified frequency;
   a magnetometer configured to measure a strength of the magnetic field; and
   a controller configured to filter measurements of the magnetometer at the specified frequency to extract variance in the strength of the magnetic field associated with the electromagnetic source and determine a change in ride height of a vehicle body.

2. The vehicle having the ride height sensing system of claim 1, wherein the magnetometer is a hall effect based sensor.

3. The vehicle having the ride height sensing system of claim 2, wherein the hall effect based sensor is capable of sensing a multi-axis magnetic field.

4. The vehicle having the ride height sensing system of claim 1, wherein the controller utilizes the filtered measurements to determine physical distance units for ride height measurements.

5. The vehicle having the ride height sensing system of claim 4, wherein the controller utilizes the determined physical distance units to obtain desired ride height distance measurements directly from the measurements by the magnetometer.

6. The vehicle having the ride height sensing system of claim 1, wherein the electromagnetic source is capable of high switching rates.

7. The vehicle having the ride height sensing system of claim 1, wherein the extraction of the variance in the strength of the magnetic field associated with the electromagnetic source is a real-time extraction.

8. The vehicle having the ride height sensing system of claim 1, wherein the controller utilizes the determined ride height to activate an active suspension system of the vehicle.

9. The vehicle having the ride height sensing system of claim 1, wherein the controller is configured to determine a frequency of the electromagnetic source.

10. The vehicle having the ride height sensing system of claim 1, wherein the controller is configured to decompose a multi-axes reading for magnetic field data regarding each axis.

11. A ride height sensing method for a vehicle comprising:
configuring an electromagnetic source of the vehicle to produce a magnetic field signal at a specified frequency
receiving, from a magnetometer of the vehicle, measurements of a magnetic field;
filtering the measurements to extract variances of strength of the magnetic field associated with the specified frequency; and
determining a change in ride height of a vehicle body based on the variances of the strength of the magnetic field.

12. The ride height sensing method for the vehicle of claim 1, wherein the magnetometer is a hall effect based sensor.

13. The ride height sensing method for the vehicle of claim 12, wherein the hall effect based sensor is capable of sensing a multi-axis magnetic field.

14. The ride height sensing method for the vehicle of claim 11, further comprising utilizing, by a controller, the measurements to determine physical distance units for ride height measurements.

15. The ride height sensing method for the vehicle of claim 14, further comprising utilizing, by the controller, the determined physical distance units to obtain desired ride height distance measurements directly from the variances of the strength of the magnetic field measured by the magnetometer.

16. The ride height sensing method for the vehicle of claim 11, wherein the electromagnetic source is capable of high switching rates.

17. The ride height sensing method for the vehicle of claim 11, wherein the extraction of the variances of the strength of the magnetic field associated with the specified frequency is a real-time extraction.

18. The ride height sensing method for the vehicle of claim 11, further comprising utilizing, by a controller, the determined ride height to activate an active suspension system of the vehicle.

19. The ride height sensing method for the vehicle of claim 11, further comprising configuring a controller to determine a frequency of the electromagnetic source.

20. A vehicle comprising:
a first electromagnetic source associated with a first axis of the vehicle configured to produce a first magnetic field at a first frequency;
a second electromagnetic source associated with a second axis of the vehicle configured to produce a second magnetic field at a second frequency, the second frequency different from the first frequency;
a magnetometer configured to measure a total magnetic field proximate the vehicle;
a controller configured to:
filter, at the first and second frequencies, the measurement of the total magnetic field to determine a first variance in strength of the first magnetic field and a second variance in strength of the second magnetic field; and
determine a change in ride height of a body of the vehicle based on the variances of strength of the first and second magnetic fields.

* * * * *